United States Patent
Muylaert et al.

(10) Patent No.: US 8,262,358 B1
(45) Date of Patent: Sep. 11, 2012

(54) ULTRA-LIGHT WEIGHT SELF-LUBRICATING PROPELLER HUB

(75) Inventors: Neal W. Muylaert, Apache Jct, AZ (US); Lyndon C. Lamborn, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 12/472,201

(22) Filed: May 26, 2009

(51) Int. Cl.
*B63H 1/06* (2006.01)
(52) U.S. Cl. .................................. 416/134 A; 416/174
(58) Field of Classification Search ............... 416/134 A, 416/141, 174, 204 R, 221, 241 R, 241 A, 416/244 R
See application file for complete search history.

(56) References Cited

U.S. PATENT DOCUMENTS

| | | | |
|---|---|---|---|
| 1,908,893 A * | 5/1933 | Edman | 416/166 |
| 4,281,966 A * | 8/1981 | Duret et al. | 416/134 A |
| 4,591,313 A | 5/1986 | Miyatake et al. | |
| 5,102,301 A | 4/1992 | Morrison | |
| 5,104,291 A | 4/1992 | Morrison | |
| 5,284,420 A * | 2/1994 | Guimbal | 416/134 A |
| 6,383,042 B1 | 5/2002 | Neisen | |
| 6,443,701 B1 | 9/2002 | Muhlbauer | |
| 6,609,892 B1 | 8/2003 | Kreul et al. | |
| 6,835,349 B2 * | 12/2004 | Pyzik et al. | 419/5 |
| 2004/0118969 A1 | 6/2004 | MacCready | |
| 2008/0279689 A1 | 11/2008 | Sebald | |
| 2009/0092493 A1 | 4/2009 | Violette | |

FOREIGN PATENT DOCUMENTS

GB 942370 11/1963
* cited by examiner

*Primary Examiner* — Matthew Reames
(74) *Attorney, Agent, or Firm* — Hanley, Flight & Zimmerman, LLC

(57) ABSTRACT

A propeller assembly includes a rotatable hub having a center metal hub portion and an outer composite hub portion. A set of composite propeller blades are mounted for pitch control rotation on the hub by a set of dry bearings.

24 Claims, 6 Drawing Sheets

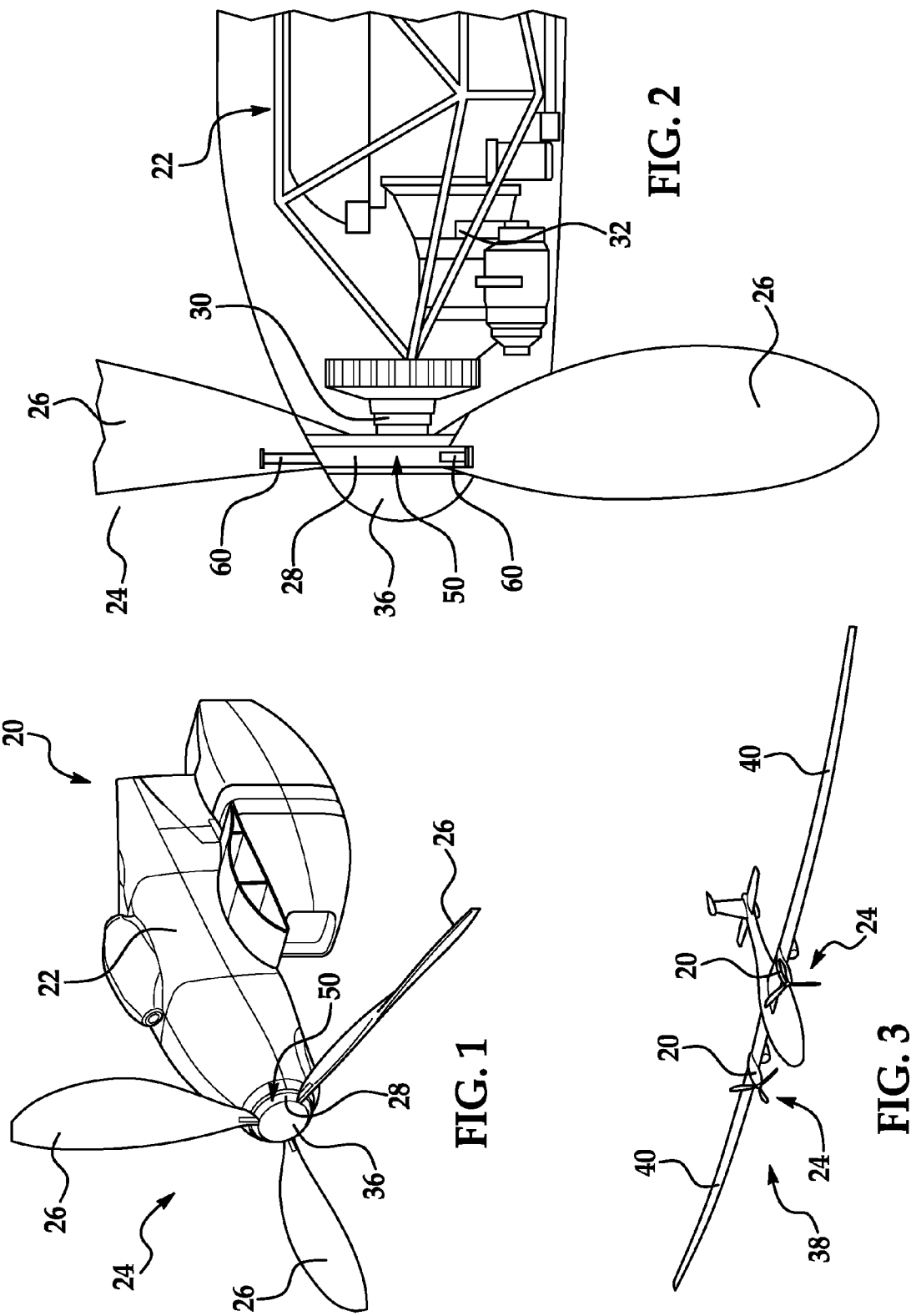

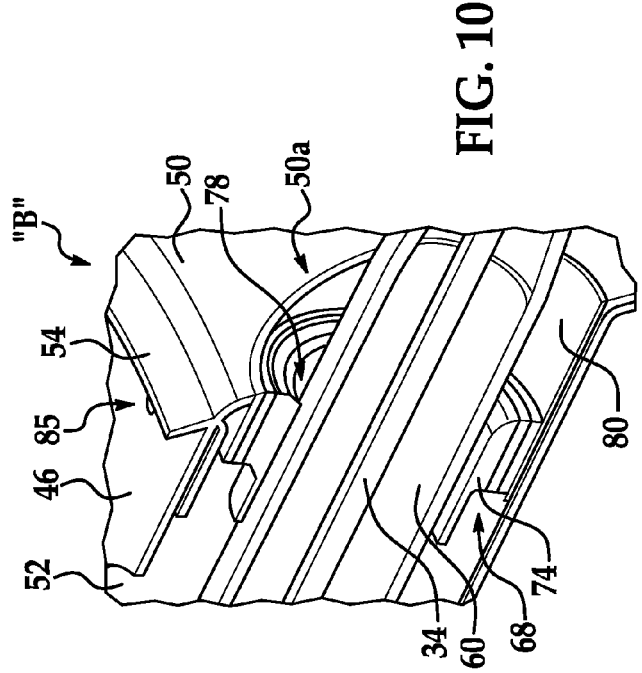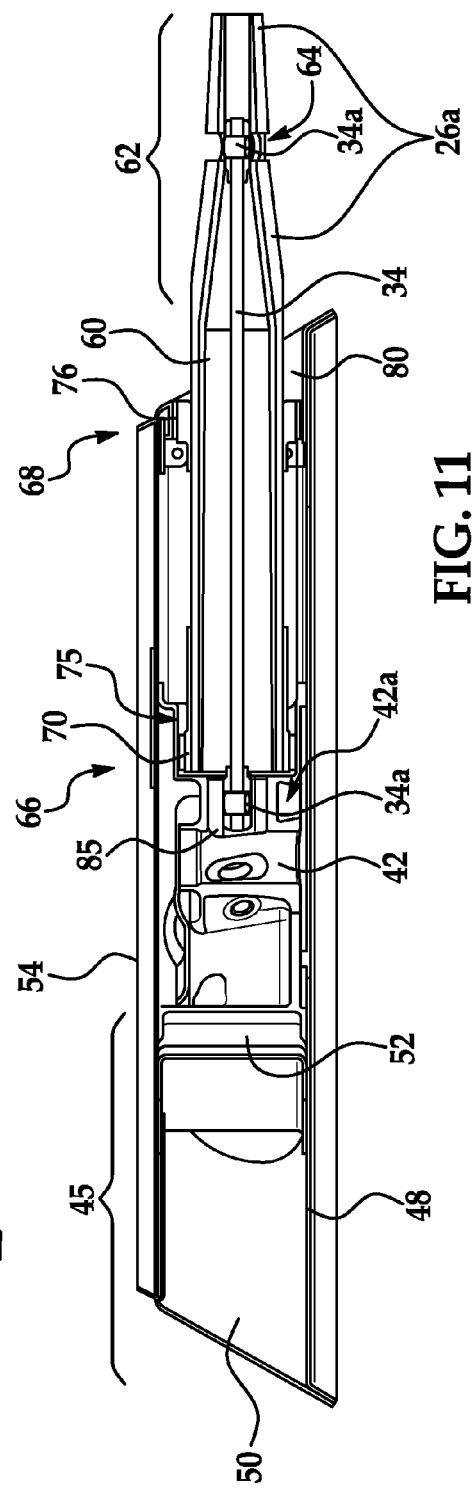

ULTRA-LIGHT WEIGHT SELF-LUBRICATING PROPELLER HUB

TECHNICAL FIELD

This disclosure generally relates to aircraft, and deals more particularly with an ultra-light weight, self-lubricating propeller hub, especially for airplanes.

BACKGROUND

Airplane propellers often use a hub for mounting a plurality of propeller blades on a drive shaft driven by an engine. Some propeller hubs have provision for pitch control to allow adjustment of blade pitch as the propeller rotates. Airplane propellers spinning at high rates with pitch adjustment subject hub components to a variety of relatively significant loads, including centrifugal force produced by the blades. To react these loads, prior hubs utilized relatively heavy components and closely coupled, roller bearings that use wet lubricants and a separate aerodynamic fairing to direct the airflow around the hub.

A variety of new airplane designs require reductions in the size and weight of components, including propeller hubs. For example ultra-light weight, high altitude, long range airplanes may require lighter weight components, including propeller hubs, in order to meet performance specifications. Existing designs for propeller hubs employ components that may be too large and/or too heavy for use in these applications. In addition, the exceptionally cold temperatures encountered at high altitudes increase the viscosity of wet bearing lubrication, which in turn reduces the efficiency of the propeller.

Accordingly, there is a need for a compact propeller hub that employs light-weight components, and which reduces or eliminates the need for wet lubricated bearings.

SUMMARY

The disclosed embodiments provide a propeller having a hub that employs a hybrid of metal and composites in order to maximize structural efficiency within an allotted space envelope. A composite portion of the hub includes an outer composite conical section that serves both as an aerodynamic fairing and as a means for structurally supporting the propeller blades. Dry bearings are used to mount the blades on the hub for pitch rotation. Bearing couple is maximized within the allotted envelope, thereby reducing the moment reacting forces on the pitch change bearings. The distance between the pitch change bearings is maximized, thereby minimizing the moment reaction loads on the bearings which in turn may increase bearing life. Light weight flexible straps connect the blades to the hub and the blades are used to react centrifugal force generated by rotation of the propeller, while allowing rotation for pitch adjustment.

According to one disclosed embodiment, a propeller includes a rotatable hub having a center hub portion and an outer hub portion. A set of propeller blades are rotatably mounted on the center and outer hub portions for blade pitch adjustment using dry bearings. The outer hub portion is substantially entirely formed of composite materials and surrounds the center hub portion.

According to another embodiment, an airplane propeller assembly includes a propeller having a plurality of propeller blades. A rotatable hub includes a center hub portion and an outer composite hub portion surrounding and mounted on the center hub portion. Means are provided for mounting a first section of each of the blades on the center hub portion and for mounting a second section of each of the blades on the outer hub portion. The mounting means may include first and second sets of dry bearings. Each of the propeller blades includes a composite blade body and a fitting that is connected to the center hub portion by a flexible strap in order to react centrifugal force applied to the blade by rotation of the propeller.

According to still another embodiment, an airplane propeller having blade pitch control comprises a propeller having a plurality of propeller blades. A rotatable hub includes an exposed outer section forming a fairing. Means are provided for rotatably mounting each of the blades on the exposed outer section for pitch adjustment. The mounting means include a composite bearing having a low friction coating.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

FIG. 1 is a perspective illustration of an airplane engine including a propeller assembly according to the disclosed embodiments, portions of the blades being cut away to reveal blade root fittings.

FIG. 2 is a side view illustration of a forward portion of the engine and propeller assembly shown in FIG. 1.

FIG. 3 is a perspective illustration of a typical airplane utilizing the engine and propeller assembly shown in FIGS. 1 and 2.

FIG. 10 is a perspective illustration of the area designated as "B" in FIG. 5.

FIG. 11 is a cross sectional illustration through the hub assembly.

DETAILED DESCRIPTION

Figure 4:
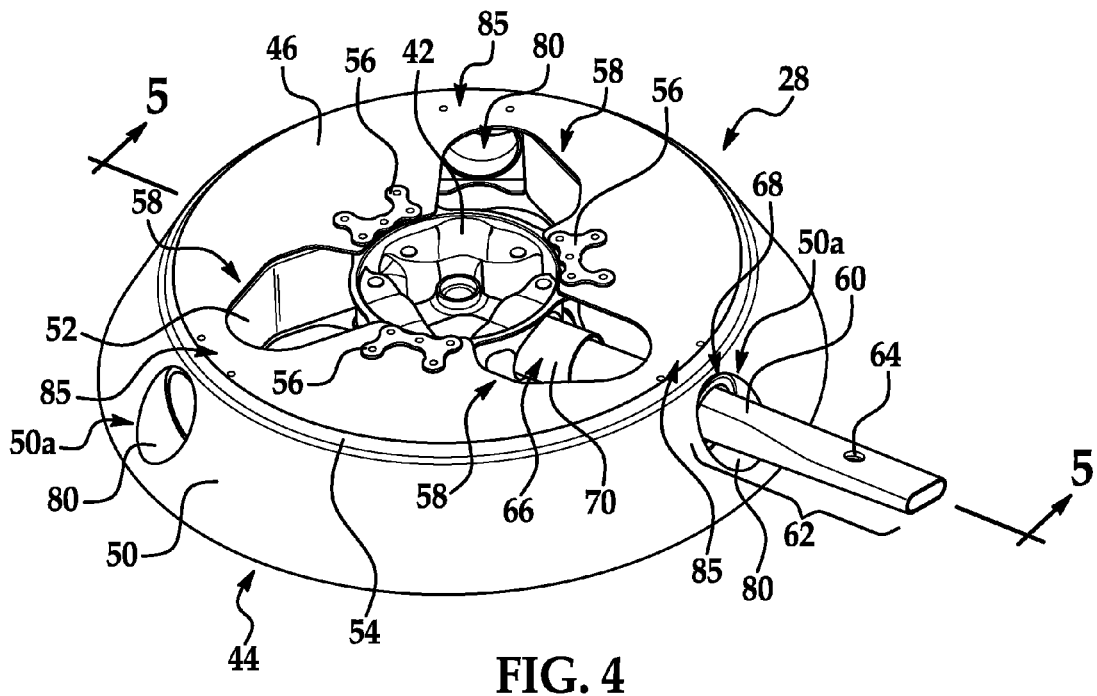
FIG. 4 is an isometric illustration of the forward part of the hub including a single blade fitting, the remainder of the blades having been removed for clarity.

Referring first to FIGS. 1-3, one or more engines 20 may be used to power an airplane 38, which in the illustrated example, is an ultra-light weight airplane having extended wings 40 suitable for long range, high altitude applications. However, the disclosed embodiments may be used in connection with a wide range of other aircraft.

The engine 20 rotates a propeller 24 which, in the illustrated example, includes three variable pitch propeller blades 26. The blades 26 are mounted on a propeller hub 28 which is connected to a rotational drive interface 30 forming part of a gearbox 32 driven by a motor 22. The blades 26 are mounted for rotation on the hub by blade root fittings 60 (FIG. 2) and later discussed tension straps (not shown). The hub 28 includes an exposed tapered structural section 50 that forms an aerodynamic transition or fairing between a nosepiece or "spinner" 36 and an engine nacelle 22.

Figure 5:
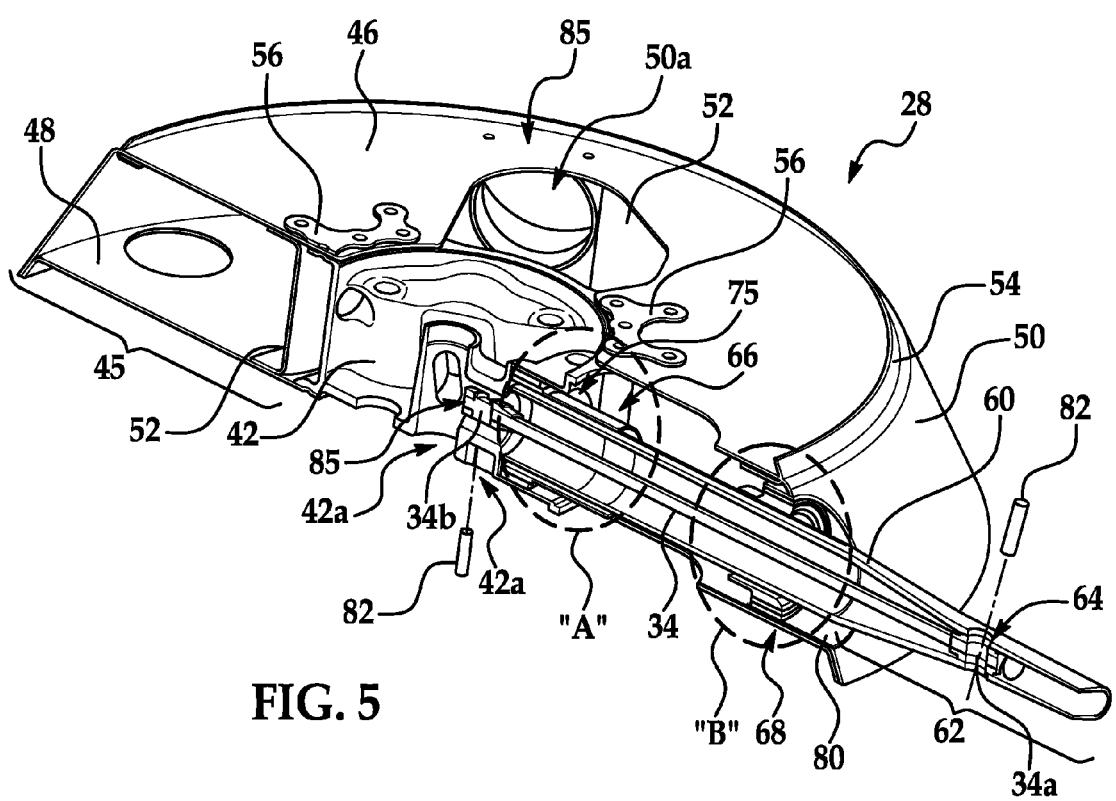
FIG. 5 is a sectional illustration taken along the line 5-5 in FIG. 4.
Figure 6:
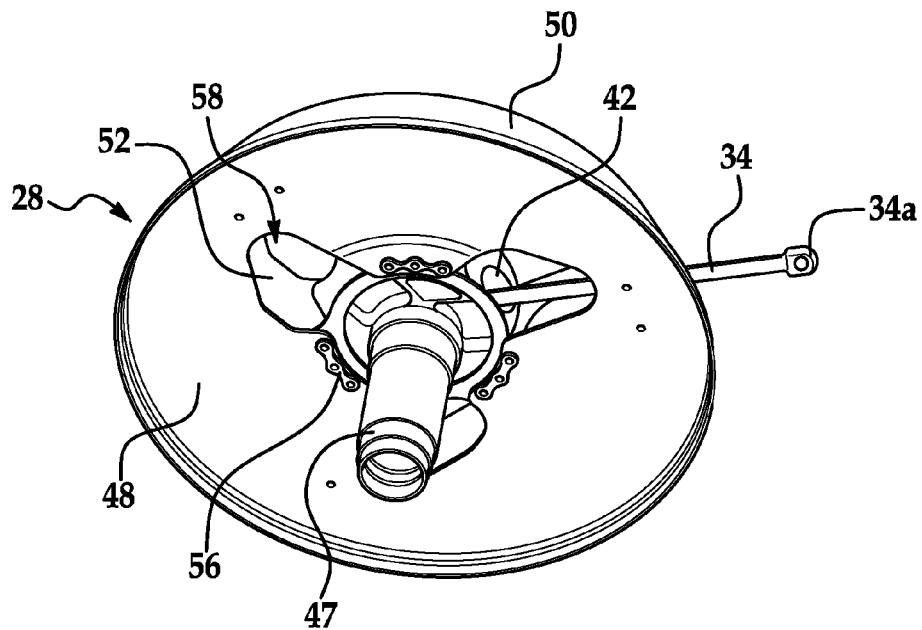
FIG. 6 is an isometric illustration of the aft end of the hub.

Attention is now directed to FIGS. 4-13 which illustrate additional details of the propeller hub 28. As best seen in FIG. 5, the hub 28 broadly includes a center hub portion 42 and a drum-like composite outer hub portion 45 which surrounds and is mounted on the inner hub portion 42. The outer hub portion 45 is generally hollow and broadly includes fore and aft, spaced apart composite hub plates 46, 48 respectively, connected together at their outer peripheries by the tapered composite structural section 50. The hub plates 46, 48 may each include cut away areas or openings therein 58 to reduce the weight of the hub 28. The inboard perimeter of the hub plates 46, 48 are connected to each other by three, boomerang-shaped composite stiffener ribs 52 (see FIGS. 5 and 7) which are generally C-shaped in cross section and function to bridge and stabilize the hub plates 46, 48. The hub plates 46, 48, structural fairing section 50 and ribs 52 may be joined together by co-bonding although the use of some fasteners may be desirable or necessary. Hub plate 46 may include an outer circumferential lip 54 (FIGS. 4 and 10) used to assist in centering and mounting the spinner 36 (FIGS. 1 and 2) on the hub 28.

Figure 7:
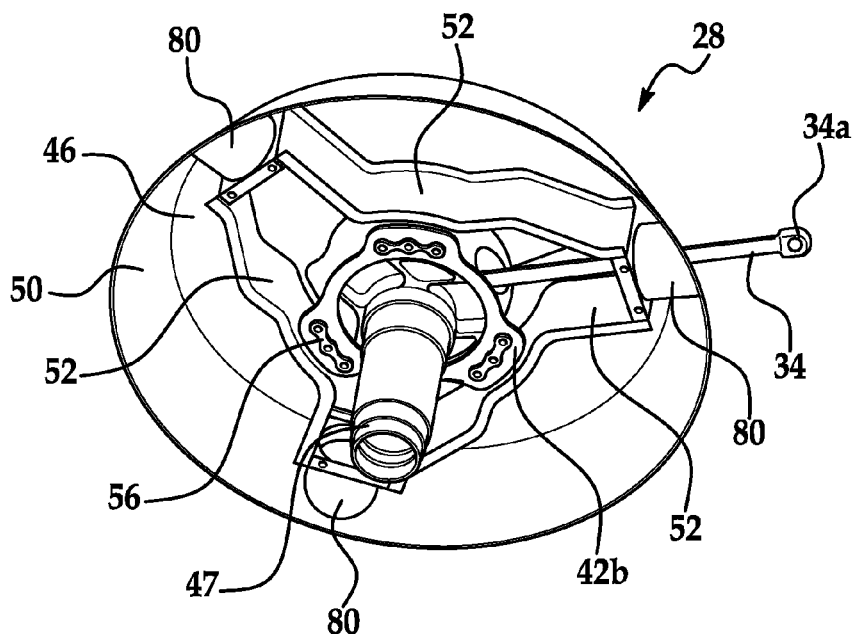
FIG. 7 is an illustration similar to FIG. 6 with the aft hub plate having been removed to illustrate additional details of the hub.
Figure 8:
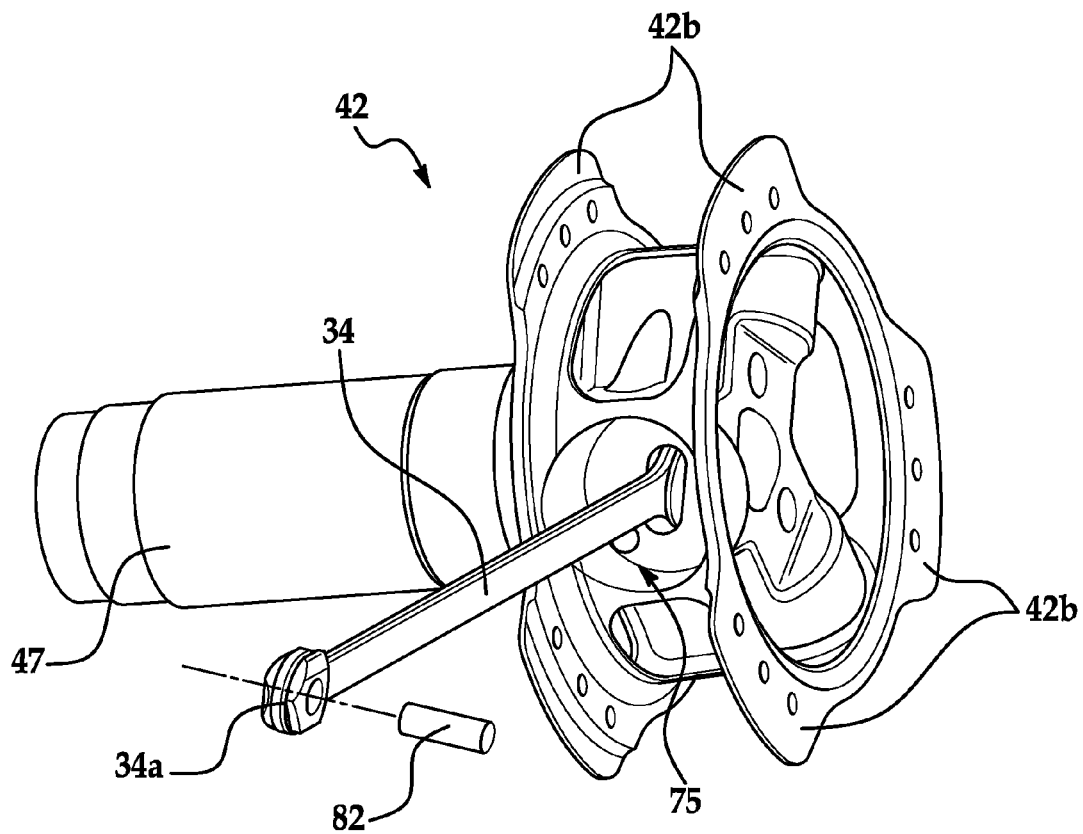
FIG. 8 is an isometric illustration of the center hub portion and a blade tension strap.
Figure 9:
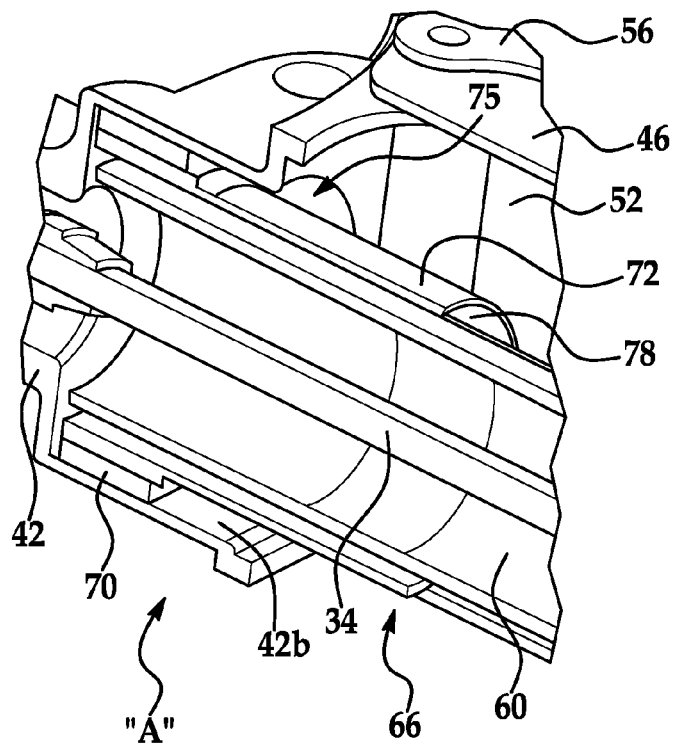
FIG. 9 is a perspective illustration of the area designated as "A" in FIG. 5.
Figure 12:
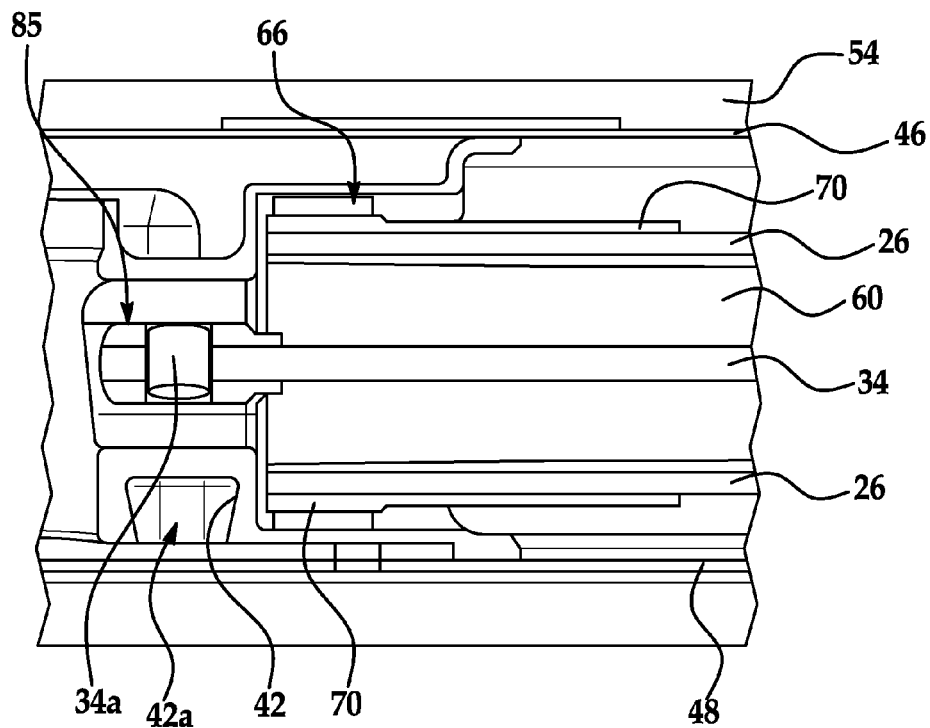
FIG. 12 is a sectional illustration showing additional details of the inboard bearing, blade fitting and tension strap.
Figure 13:
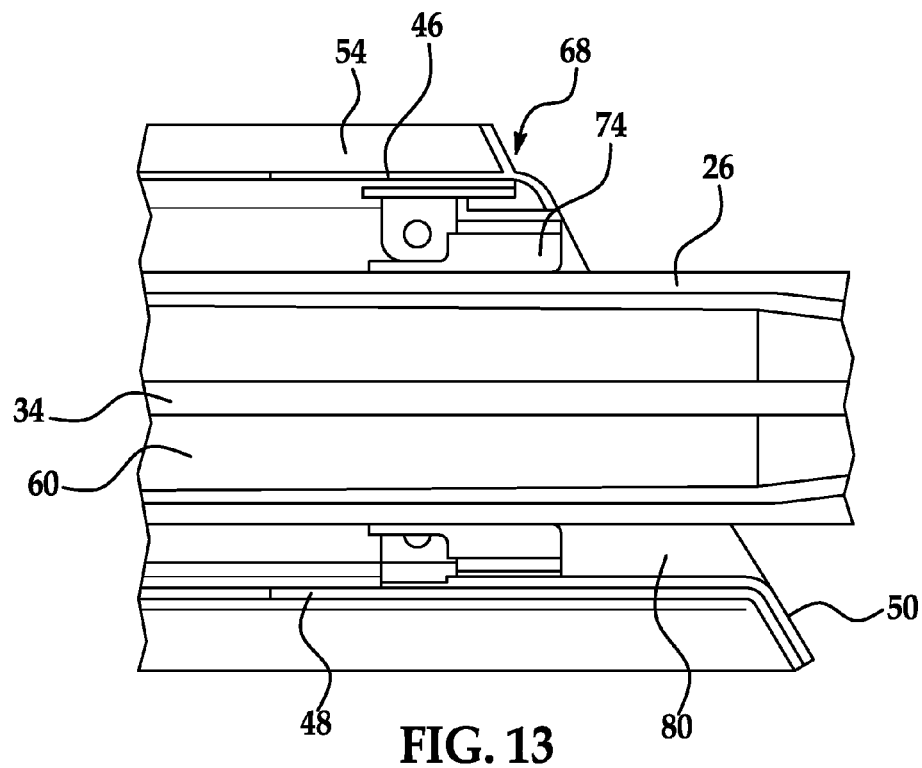
FIG. 13 is a sectional illustration showing additional details of the outboard bearing, blade fitting and tension strap.

The center hub portion 42 may be formed of any suitable metal such as alloys of aluminum, titanium or others, and may be cast or machined as a single piece. As best seen in FIGS. 7 and 8, the center hub portion 42 includes two sets of spaced apart, radially extending flanges 42b. The flanges 42b provide a means of mounting the outer hub portion 45 on the center hub portion 42, while also transferring torque from the center hub portion the outer hub portion 45. Inboard portions of the hub plates 46, 48 are sandwiched between the flanges 42b on the central hub portion 42, and metal stiffener plates 56 which may be secured to the flanges 42b by fasteners (not shown). The stiffener plates 56 stiffen the connection between the center and outer hub portions 42, 45 respectively. As shown in FIG. 5, the center hub portion 42 includes a central counterbore 42a for receiving a drive shaft adapter 47 illustrated in FIGS. 6-8. The drive shaft adapter 47 may be connected to the center hub portion 42 by any suitable means, such as welding or bolted flanges, and functions to connect the center hub portion 42 to the drive interface 30 (FIG. 2) from the gearbox 32. In some embodiments, the drive shaft adapter 47 may be integrally formed with the center hub portion 42.

As seen in FIGS. 4 and 5, each of the propeller blades 26 includes blade body 26a having a root end provided with a generally tubular, internal blade root fitting 60 that includes a tapered outboard end 62. As will be discussed later in more detail, the fitting 60 along with tension straps 34 mount the root end of the blade body 26a on the center hub portions 42. The blade body 26a may be a composite that may be formed, as by laying up and curing composite materials over the outside surface of the fitting 60. The composite material forming the blade body 26a may be, for example and without limitation, a carbon fiber epoxy which is laid up over the fitting 60 either by hand or using automated material placement equipment (not shown).

Referring to FIG. 5, each of the blade fittings 60 is mounted for pitch rotation on the hub 28 by means of spaced apart inboard and outboard pitch rotation bearing assemblies 66. The bearing assemblies 66, 68 respectively include dry inboard and outboard bearings 70, 74 respectively bonded to the hub 28. As used herein, "dry" bearings refers to any of a wide variety of self-lubricating and "greaseless" bearings that do not employ wet lubricants such as grease that may increase in viscosity with decreasing temperature. Each of the bearings 70, 74 may comprise, for example and without limitation, a polytetrafluoroethylene (PTFE), also known as Teflon®. Depending upon the application, other dry, low friction materials may be used as the bearings 70, 74. Bearings 70, 74 respectively engage and bear against metallic cuffs 72, 76, which are sleeved over and fixed to blade body 26a, as best seen in FIG. 11.

The inboard bearing 70 is generally cylindrical in shape and supports the root end of the blade 26 for rotation along a portion of its length inside the center hub portion 42. The outboard bearing 74 is also cylindrically shaped and supports an outboard portion of the root end of the blade 26 for rotation on the structural faring section 50. The pitch change bearings 70, 74 react the propeller blade moment loads while providing the rotational freedom required to vary the pitch of the blades 26.

The bearing 70 along with the root end of the blade 26 are nested within a counterbore 75 in the central hub portion 42, as best seen in FIGS. 5, 8, 9 and 11. Bearing 74 is held in a tubular metal bearing journal 80 which may be formed from a suitable metallic alloy. As seen in FIGS. 4, 5, 7 and 10, bearing journal 80 passes through circular openings 50a in the fairing 50 and may be bolted and bonded to the hub plates 46, 48, and to the ribs 52. The bolted interface area 85 between the bearing journal 80 and the hub plates 46, 48 provides an anchor point where weights (not shown) may be attached to balance the propeller 24. By placing the outer surface of the fore hub plate 46 directly on the outer mold line of the outer hub portion 45, the bearing couple is extended to its maximum length within the allotted envelope, thereby resulting in a minimal load and maximum endurance for the bearings 70, 74.

As previously mentioned, each of the blades 26 is connected to the center hub portion 42 by means of a flexible, torsionally compliant tension strap 34 coaxially disposed within each of the blade root fittings 60. The tension straps 34 react centrifugal force on the blade 26 generated by rotation of the propeller 24. The straps 34 may comprise, without limitation, multiple plies of a flexible composite material that allows the strap 34 to compliantly twist in torsion during blade pitch rotation. One end of each of the straps 34 is connected to the tapered portion 62 of the fitting 60 by means of a cylindrical retainer 34a and a pin 82 (FIG. 5) which passes through an opening 64 in the blade fitting 60. The opposite end of the strap 34 is secured to the center hub portion 42 by means of a second cylindrical retainer 34a and a pin 82 (FIG. 5) which are captured in a recess 85 (FIGS. 5, 11 and 12) formed within the center hub portion 42.

In operation, the inboard and outboard bearing assemblies 66, 68 respectively, allow pitch rotation of the blades 26 without the need for grease or similar wet lubrication that may become viscous at extreme low temperatures. The tension straps 34 react the centrifugal force generated by the spinning blades 26, yet allow rotation of the blades 26 during pitch adjustment. The light-weight outer hub portion 45 allows mounting of a portion of the blade 26 on the structural fairing section 50, thus reducing the overall weight of the hub assembly 28.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A propeller, comprising:
    a rotatable hub including a center hub portion and a hollow outer hub portion connected to the center hub portion;
    a set of propeller blades said blades; and
    a set of dry bearings for mounting each of the propeller blades on the center and outer hub portions for blade pitch rotation, said set comprising a first cylindrically shaped dry bearing supporting an inboard portion of a root end of the blade inside the center hub portion and a second cylindrically shaped dry bearing supporting an outboard portion of the root end of the blade inside an outer hub portion.

2. The propeller of claim 1, wherein the outer hub portion is substantially entirely formed of composite material and surrounds the center hub portion.

3. The propeller of claim 2, wherein the outer hub portion includes:
    first and second spaced apart composite plates, and
    a composite fairing connecting the fore and aft composite plates.

4. The propeller of claim 1, wherein each set of the dry bearings includes:
    said first and second bearings respectively mounted on the center hub portion and the outer hub portion.

5. The propeller of claim 4, wherein each of the first and second bearings includes a low friction material engaging a metal portion of a propeller blade.

6. The propeller of claim 1, wherein the dry bearings have a coefficient of friction equal to or less than the coefficient of friction of polytetrafluoroethylene against a metal material.

7. The propeller of claim 1, wherein:
    the center hub portion is metal, and
    the outer hub portion is composite.

8. The propeller of claim 1, wherein:
    the outer hub portion includes a composite fairing, and
    the set of dry bearings includes said second bearing respectively mounting each of the blades on the composite fairing.

9. An airplane propeller assembly, comprising:
    a propeller including a plurality of propeller blades;
    a rotatable hub including a center hub portion and a hollow outer composite hub portion surrounding and mounted on the center hub portion; and,
    means for mounting a first section of each of the blades on the center hub portion and for mounting a second section of each of the blades on the outer hub portion, said means comprising a first cylindrically shaped dry bearing supporting an inboard portion of a root end of the blade inside the center hub portion and a second cylindrically shaped dry bearing supporting an outboard portion of the root end of the blade inside an outer hub portion.

10. The airplane propeller assembly of claim 9, wherein the center hub portion is formed of metal.

11. The airplane propeller assembly of claim 9, wherein the outer hub portion is a substantially hollow drum.

12. The airplane propeller assembly of claim 9, wherein the mounting means includes;
    said first bearing mounting the blade on the center portion of the hub, and
    said second bearing mounting the blade on the outer portion of the hub.

13. The airplane propeller assembly of claim 12, wherein each of the first and second bearings includes polytetrafluoroethylene.

14. The airplane propeller assembly of claim 9, wherein each of the propeller blades includes:
    a composite blade body having a root end and an outer end,
    a fitting secured to the root end of the blade body,
    a flexible member connecting the fitting to the center hub portion and reacting centrifugal force applied to the blade by rotation of the propeller.

15. The airplane propeller assembly of claim 14, wherein:
    the fitting is substantially tubular,
    the composite blade body covers the fitting, and
    the flexible member is coaxially disposed within the fitting.

16. The airplane propeller assembly of claim 14, wherein:
    the mounting means includes said first and second dry bearings engaging metal portions of the composite blade body.

17. The airplane propeller assembly of claim 14, wherein the mounting means includes:
    a metal composite bearing journal for holding each dry bearing.

18. An airplane propeller having blade pitch control, comprising:
    a propeller including a plurality of propeller blades;
    a rotatable hub including a center hub portion and a hollow outer composite hub portion surrounding and mounted on the center hub portion, said outer hub including an outer section forming an aerodynamic fairing; and
    means for mounting the blades for pitch rotation on the hub, said means comprising a first cylindrically shaped dry bearing supporting an inboard portion of a root end of the blade inside the center hub portion and a second cylindrically shaped dry bearing supporting an outboard portion of the root end of the blade inside the outer hub portion.

19. The airplane propeller of claim 18, wherein
    said first bearing mounts the blade on the center portion of the hub, and
    said second bearing mounts the blade on the outer portion of the hub.

20. The airplane propeller of claim 19, wherein the means for mounting each of the blades on the exposed outer section dry bearings include:
    a respective dry bearing held in a bearing journal.

21. The airplane propeller of claim 18, wherein each dry bearing comprises
    a self-lubricating dry bearing, and
    a metal bearing journal mounted on a respective center and outer hub for supporting the bearing.

22. The airplane propeller of claim 18, wherein the mounting means includes:
    torsionally compliant straps for respectively connecting each of the blades to the hub and for reacting centrifugal force applied to the blade by rotation of the propeller.

23. The airplane propeller of claim 22, wherein the mounting means includes a plurality of fittings for respectively connecting the straps to the blades.

24. The airplane propeller of claim 22, wherein each of the straps is flexible and may twist upon rotation of the corresponding blade.

* * * * *